(12) United States Patent
Chae et al.

(10) Patent No.: US 8,439,504 B2
(45) Date of Patent: May 14, 2013

(54) AUTOMATIC MODE SWITCHING BETWEEN SINGLE AND MULTIPLE PROJECTORS

(75) Inventors: Sangwon Chae, Irvine, CA (US); Hung Khei Huang, Irvine, CA (US); Yasuhiro Komori, Irvine, CA (US)

(73) Assignee: Canon Kabushiki Kaisha, Tokyo (JP)

(*) Notice: Subject to any disclaimer, the term of this patent is extended or adjusted under 35 U.S.C. 154(b) by 242 days.

(21) Appl. No.: 12/716,248

(22) Filed: Mar. 2, 2010

(65) Prior Publication Data

US 2011/0216284 A1 Sep. 8, 2011

(51) Int. Cl.
*G03B 21/26* (2006.01)
*G03B 21/14* (2006.01)

(52) U.S. Cl.
USPC ................................ 353/30; 353/48; 353/69

(58) Field of Classification Search .................... 353/30, 353/34, 48, 51, 94
See application file for complete search history.

(56) References Cited

U.S. PATENT DOCUMENTS

| | | | |
|---|---|---|---|
| 6,733,138 B2 * | 5/2004 | Raskar ........................... | 353/94 |
| 6,755,537 B1 | 6/2004 | Raskar et al. .................. | 353/94 |
| 7,119,833 B2 | 10/2006 | Jaynes et al. .................. | 348/189 |
| 7,125,122 B2 | 10/2006 | Li et al. ......................... | 353/31 |
| 2006/0152680 A1* | 7/2006 | Shibano ......................... | 353/30 |
| 2009/0135200 A1 | 5/2009 | Schultz ......................... | 345/629 |
| 2009/0201431 A1* | 8/2009 | Izumida ........................ | 348/747 |

OTHER PUBLICATIONS

Sukthankar, et al., "Smarter Presentations: Exploiting Homography in Camera-Projector Systems", Proceedings of International Conference on Computer Vision, 2001, 7 pages.
R. Raskar, et al., "A Self Correcting Projector", Mitsubishi Electric Research Laboratories, Dec. 2001, 7 pages.
H. Chen, et al., "Scalable Alignment of Large-Format Multi-Projector Displays Using Camera Homography Trees", Proceedings of Visualization, 2002.
U.S. Appl. No. 12/403,316, filed Mar. 12, 2009, Inventors: Seyed Behzad Sajadi, Yasuhiro Komori and Hung Khei Huang.

* cited by examiner

*Primary Examiner* — Thanh Luu
*Assistant Examiner* — Renee Naphas
(74) *Attorney, Agent, or Firm* — Fitzpatrick, Cella, Harper & Scinto

(57) ABSTRACT

Control of a multiprojector system having multiple projectors arranged in a projector array. It is determined whether the projector array is positioned to form one object or two or more objects. A first keystone correction mode is selected if it is determined that the projector array is positioned to form one object. A second keystone correction mode is selected if it is determined that the projector array is positioned to form two or more objects. In the first keystone correction mode, a homography transformation for each of the projectors is derived so as to accommodate keystone correction of all projectors in the projector array involved in the projection of the single object. In the second keystone correction mode, a homography transformation for each of the projectors is derived so as to accommodate keystone correction of all projectors involved in the projection of each object.

34 Claims, 6 Drawing Sheets

AUTOMATIC MODE SWITCHING BETWEEN SINGLE AND MULTIPLE PROJECTORS

FIELD

The present disclosure relates to automatic mode switching between single and multiple projectors, and more particularly relates to automatic mode switching between single and multiple projectors for keystone correction of projected images.

BACKGROUND

Keystone correction is provided in order to correct an image being projected by a projection system, which would otherwise be distorted principally due to an angle of projection from the projection system to the projection screen.

Typically, keystone correction is applied to a projection system so as to obtain a homography transformation that results in good image fidelity between a source image and a projected image. When the projection system includes multiple projectors in a projector array, the homography transformation is ordinarily derived for a single object, regardless of the number of objects actually formed by the projection system.

A more detailed description of a typical keystone correction is provided in "Smarter Presentations: Exploiting Homography in Camera-Projector Systems", R. Sukthankar, et al., Proceedings of International Conference on Computer Vision (2001) and in "A Self Correcting Projector", R. Raskar, et al., Mitsubishi Electric Research Laboratories, Inc. (2001).

SUMMARY

One difficulty in multi-projector systems arises when the projectors in the projector array are positioned to form more than one object (i.e., more than one projection area). In this case, the use of a homography transformation obtained for the display of a single object ordinarily results in the inefficient use of each projection area when more than one object is actually projected.

The foregoing situation is addressed by deriving a homography transformation for each of the projectors involved in the projection of a single object if the projector array is positioned to form one single object, and by deriving a homography transformation for each of the projectors involved in the projection of each object if the projector array is positioned to form more than one object.

Thus, in an example embodiment described herein, a multiprojector system includes multiple projectors arranged in a projector array. It is determined whether the projector array is positioned to form one single object or is positioned to form two or more objects. Based on the determination, one of at least first and second keystone correction modes is selected. The first keystone correction mode is selected in response to a determination that the projector array is positioned to form one object, and the second keystone correction mode is selected in response to a determination that the projector array is positioned to form two or more objects. In the first keystone correction mode, a homography transformation for each of the projectors is derived so as to accommodate keystone correction of all projectors in the projector array involved in the projection of the single object. In the second keystone correction mode, a homography transformation is derived for each of the projectors so as to accommodate keystone correction of all projectors involved in the projection of each object. Inverses of the derived homography transformations are applied for the respective projectors.

By virtue of this arrangement, it is ordinarily possible to project an image with reduced keystone distortions when the projectors in the projector array are positioned to form more than one object. In addition, it is ordinarily possible to do so without undue waste of the projection area. For example, when one projector is used to display a first object and two projectors are used to display a second object, a first homography transformation is obtained for the first projector, and second and third homography transformations are obtained for each of the two projectors, such that use of each projection area is more efficient.

In another example embodiment described herein, a multiprojector system includes multiple projectors arranged in a projector array. A first group of the multiple projectors is positioned to form a first object, and a second group of the multiple projectors is positioned to form a second object. A homography transformation for each of the projectors in the first group of projectors is derived so as to accommodate keystone correction of all projectors in the first group of projectors. A homography transformation for each of the projectors in the second group of projectors is derived so as to accommodate keystone correction of all projectors in the second group of projectors. Inverses of the derived homography transformations are applied for the respective projectors.

In example embodiments, the determination of whether the projector array is positioned to form one single object or two or more objects is made by capturing an image of a projection area projected by all of the projectors in the projector array and analyzing the captured image to detect the number of objects.

By virtue of detecting the number of projected objects, it is ordinarily possible to automatically select one of the first and second keystone correction modes, in which a homography transformation is derived for each of the projectors involved in the projection of a single object, or each of the projectors involved in the projection of each of multiple objects.

In some embodiments, an image to be projected by the multiprojector system is divided into sub-images based on an individual projection area projected by each of the projectors in the projector array. Additionally, in some embodiments, the image to be projected by the multiprojector system is divided based on an aspect ratio of the image.

In one embodiment, a maximum area for each object is calculated, and the sub-images are provided to the projectors in the projector array for display based on the maximum area for each object. In some cases, the aspect ratio is also used to calculate the maximum area for each object.

In one example embodiment, it is determined which projector is responsible for projecting an individual projection area by detecting a corner of each individual projection area projected by each of the projectors in the projector array. For example, the corner of the individual projection area projected by each of the projectors in the projector array can be detected by capturing an image of each individual projection area projected by each of the projectors in the projector array and analyzing the captured image.

This brief summary has been provided so that the nature of this disclosure may be understood quickly. A more complete understanding can be obtained by reference to the following detailed description and to the attached drawings.

DETAILED DESCRIPTION

Figure 1A:
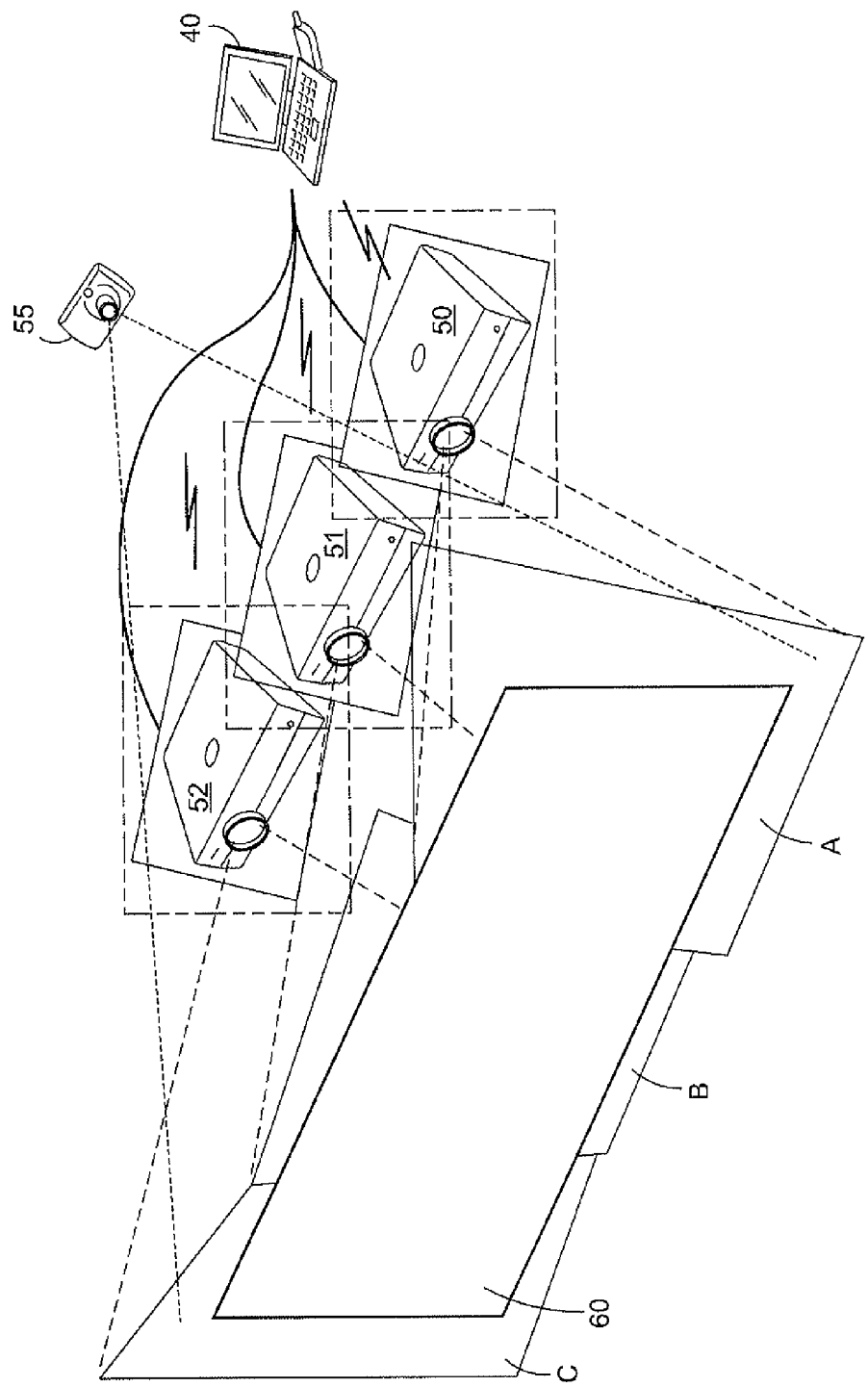
FIGS. 1A to 1C are representative views of a multiprojector system relevant to one example embodiment.
Figure 1B:
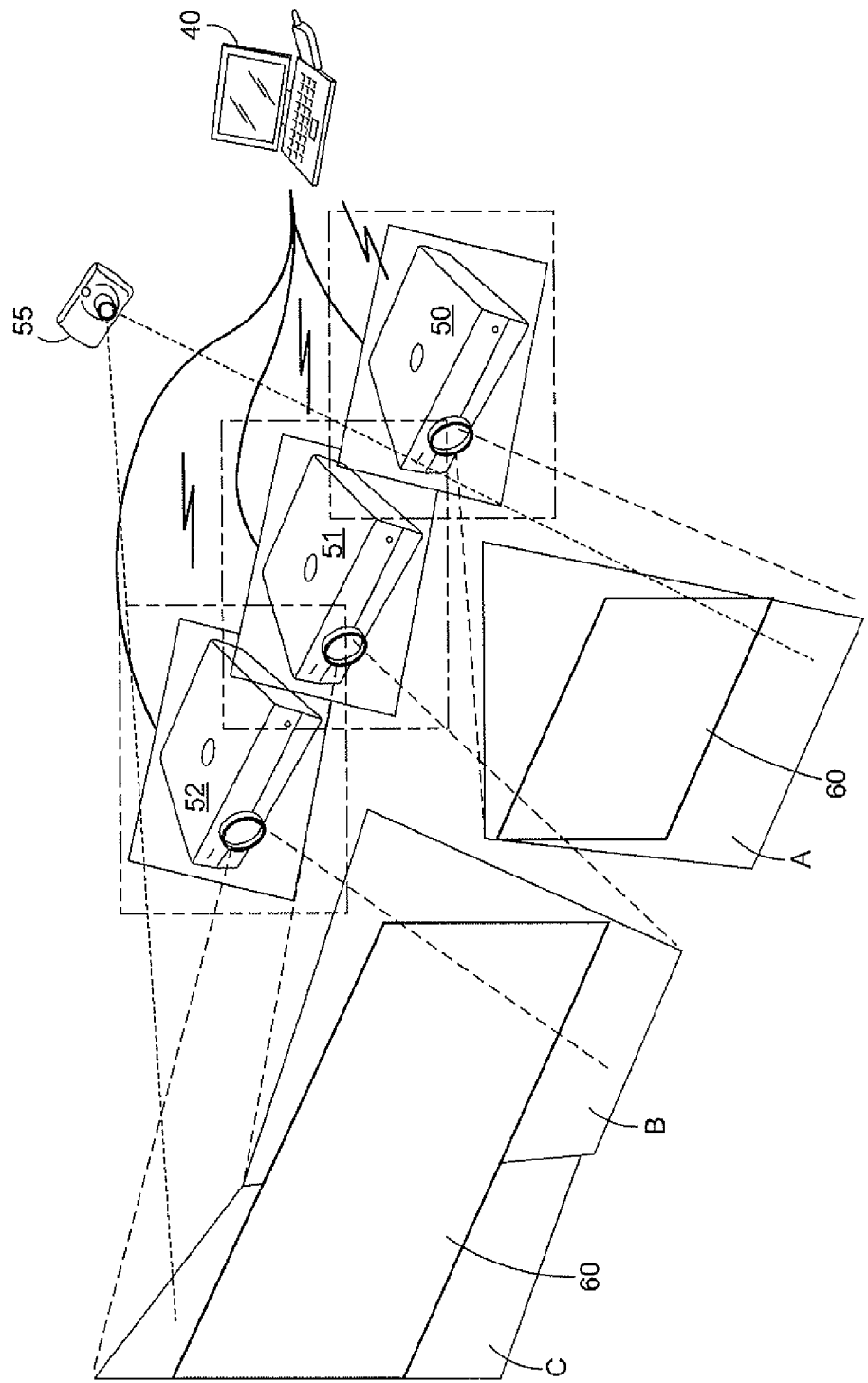
Figure 1C:
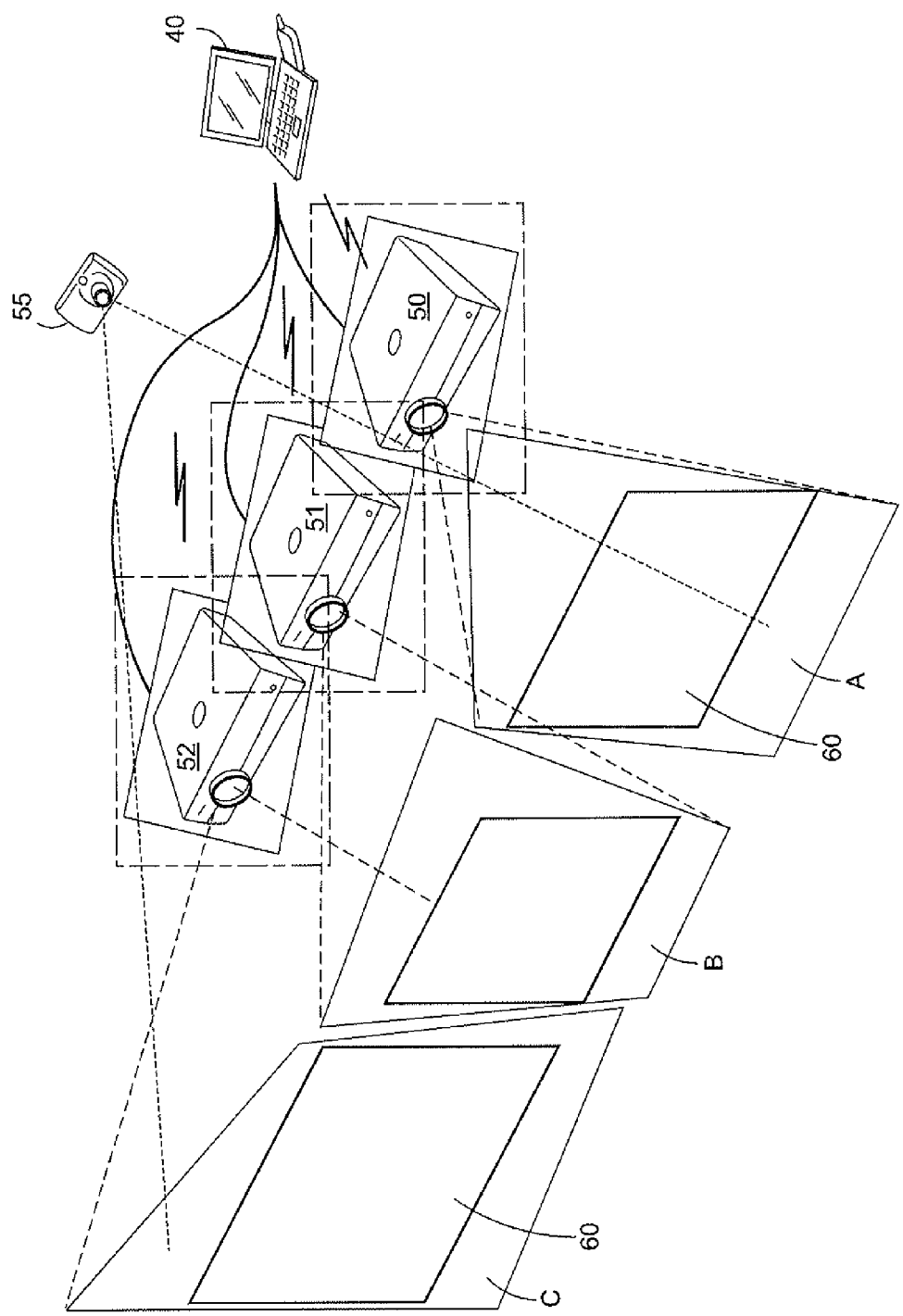

FIGS. 1A to 1C are representative views of a multiprojector system including a projector array, a host computer and camera, relevant to one example embodiment. One difference between these figures is that projectors in a multi-projector array are positioned differently to form respectively different numbers of objects. Similar components of the multiprojector systems depicted in FIGS. 1A to 1C are denoted with the same reference numerals, and a description of such components is provided below.

Host computer 40 generally comprises a programmable general purpose personal computer (hereinafter "PC") having an operating system such as Microsoft® Windows® or Apple® Mac OS® or LINUX, and which is programmed as described below so as to perform particular functions and in effect to become a special purpose computer when performing these functions. Host computer 40 includes a color monitor including a display screen, a keyboard for entering text data and user commands, and a pointing device. Pointing device preferably comprises a mouse for pointing and for manipulating objects displayed on the display screen.

Host computer 40 also includes computer-readable memory media such as a computer hard disk and a DVD disk drive, which are constructed to store computer-readable information such as computer-executable process steps. The DVD disk drive provides a means whereby the host computer can access information, such as image data, computer-executable process steps, application programs, etc. stored on removable memory media. In an alternative, information can also be retrieved through other computer-readable media such as a USB storage device connected to a USB port, or through a network interface. Other devices for accessing information stored on removable or remote media may also be provided.

Host computer 40 may acquire image data from other sources such as a digital camera, a local area network or the Internet via a network interface. Likewise, host computer 40 may interface with color output devices other than projectors 50 to 52, such as color output devices accessible over the network interface.

Host computer 40 acquires image data for an input image, and provides pre-distorted image data to each of projectors 50 to 52 such that corresponding image 60 is displayed on a projection surface with reduced keystone distortion. In addition, the image data is provided for display by projectors 50 to 52 such that the image 60 is substantially aligned with the projection screen.

In this example, projectors 50 to 52 are RGB or RGBW projectors, such as DLP™ digital projectors or other display devices that project images in accordance with image data from the host computer 40 onto a projection surface. Projectors 50 to 52 may be HDR devices capable of projecting HDR images, and may further include, for example, LCD projectors, LCOS projectors, LED projectors.

Together, projectors 50 to 52 make up a projector array, and in accordance with image data received from host computer 40, projectors 50 to 52 project image 60 onto a projection screen by using additive light combinations of red (R), green (G) and blue (B) colorant lights. In addition, and particularly in a case of an HDR device, projectors 50 to 52 also use a white (W) light so as to increase the brightness/luminance of projected images and thereby project HDR images with good fidelity over a large dynamic range.

Digital color camera 55 is an example of a color input device, and is provided for sending digital image data to host computer 40. In particular, digital color camera 55 captures images of the projection surface of the projector array in order to facilitate control of the multiprojector system.

FIG. 1A shows an example of a first case where projectors 50 to 52 are positioned to form one single object. As shown in FIG. 1A, projector 50 displays individual projection area A, projector 51 displays individual projection area B and projector 52 displays individual projection area C. In other words, individual projection areas A, B and C are respectively displayed when projectors 50 to 52 independently display white light. In this first case, individual projection areas A, B and C together comprise the one single object, and image data is provided by host computer 40 such that each of projectors 50 to 52 displays the appropriate portion of image 60 on the single object on the projection surface.

FIG. 1B shows an example of a second case where projectors 50 to 52 are positioned to form two objects. Similar to FIG. 1A, projector 50 displays individual projection area A, projector 51 displays individual projection area B and projector 52 displays individual projection area C. In this case, individual projection area A comprises a first object, and together individual projection areas B and C comprise a second object. Image data is provided by host computer 40 such that each of projectors 50 to 52 displays the appropriate portion of image 60 with reduced keystone distortion across the two objects on the projection surface.

FIG. 1C shows an example of a third case where projectors 50 to 52 are positioned to form three objects. Again, projector 50 displays individual projection area A, projector 51 displays individual projection area B and projector 52 displays individual projection area C. In this case, individual projection area A comprises a first object, individual projection area B comprises a second object, and individual projection area C comprises a third object. Image data is provided by host computer 40 such that each of projectors 50 to 52 displays the appropriate portion of image 60 with reduced keystone distortion across the three objects on the projection surface.

Figure 2:
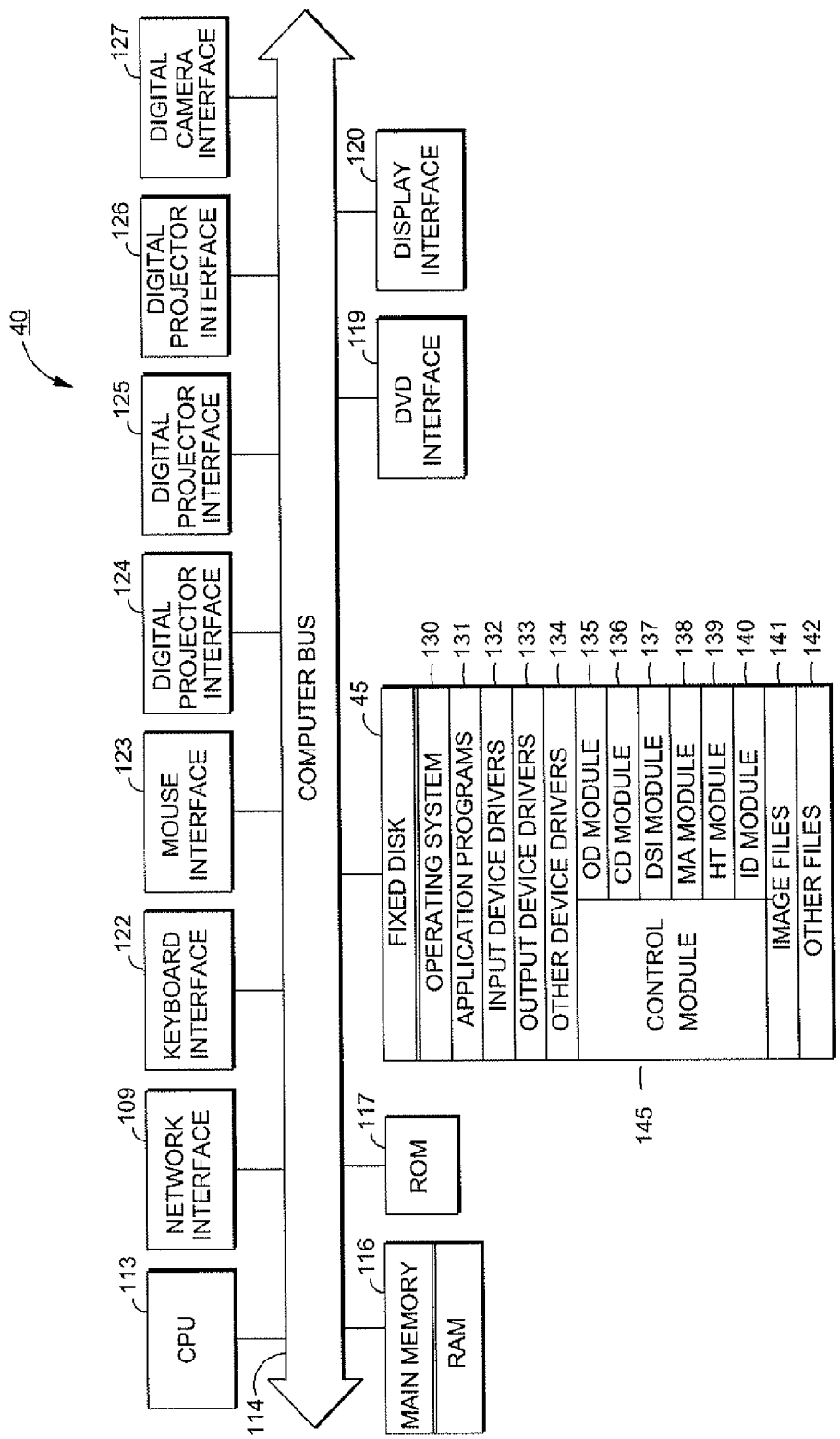
FIG. 2 is a detailed block diagram depicting the internal architecture of the host computer shown in FIG. 1.

FIG. 2 is a detailed block diagram showing the internal architecture of host computer 40. As shown in FIG. 2, host computer 40 includes central processing unit (CPU) 113 which may be a multi-core CPU and which interfaces with computer bus 114. Also interfacing with computer bus 114 are fixed disk 45, network interface 109, random access memory (RAM) 116 for use as a main run-time transient memory, read only memory (ROM) 117, DVD disk interface 119, display interface 120 for a monitor, keyboard interface 122 for a keyboard, mouse interface 123 for a pointing device, digital projector interface 124 for projector 50, digital projector interface 125 for projector 51, digital projector interface 126 for projector 52, and digital camera interface 127 for digital camera 55.

RAM 116 interfaces with computer bus 114 so as to provide information stored in RAM 116 to CPU 113 during execution of the instructions in software programs such as an operating system, application programs, control modules, and device drivers. More specifically, CPU 113 first loads computer-executable process steps from fixed disk 45, or another storage device into a region of RAM 116. CPU 113 can then execute the stored process steps from RAM 116 in order to execute the loaded computer-executable process steps. Data such as color images or other information can be stored in RAM 116, so that the data can be accessed by CPU 113 during the execution of computer-executable software programs, to the extent that such software programs have a need to access and/or modify the data.

As also shown in FIG. 2, fixed disk 45 contains computer-executable process steps for operating system 130, and application programs 131, such as graphic image management programs. Fixed disk 45 also contains computer-executable process steps for device drivers for software interface to devices, such as input device drivers 132, output device drivers 133, and other device drivers 134. Image files 141, including color image files, and other files 142 are available for output to color output devices and for manipulation by application programs.

Control module 145 comprises computer-executable process steps executed by a computer for control of a multiprojector system, where the multiprojector system includes multiple projectors arranged in a projector array. Control module 145 controls the multiprojector system such that an image is displayed on a projection screen across a number of objects and such that the image is substantially aligned with the projection screen. More specifically, control module 145 determines whether the projector array is positioned to form one single object or is positioned to form two or more objects. In response to a determination that a single object is formed, a first keystone correction mode is selected in which a homography transformation is derived for each of the projectors involved in the projection of the single object. In response to a determination that two more objects are formed, a second keystone correction mode is selected in which a homography transformation is derived for each of the projectors involved in the projection of each object. Inverses of the homography transformations are then applied to each of the images to be displayed by the respective projectors.

In addition, control module 145 includes computer-executable process steps executed by a computer which control a multiprojector system such that a homography transformation is derived for each of the projectors in a first group of projectors positioned to form a first object, so as to accommodate keystone correction of all projectors involved in the projection of the first object. A homography transformation is derived for each of the projectors in a second group of projectors positioned to form a second object, so as to accommodate keystone correction of all projectors involved in the projection of the second object.

As shown in FIG. 2, control module 145 includes, at least, computer-executable process steps for plural modules of this embodiment, including object detection (OD) module 135, corner detection (CD) module 136, divide source image (DSI) module 137, maximum area (MA) module 138, homography transformation (HT) module 139 and image display (ID) module 140.

OD module 135 is constructed to cause digital camera 55 to capture an image of a projection area projected by all projectors 50 to 52, and to analyze the captured image in order to detect a number of objects on the projection surface.

CD module 136 is constructed to detect a corner of each individual projection area projected by each of projectors 50 to 52 in order to determine which projector in the projector array is responsible for projecting a particular individual projection area. The corner of the individual projection area is detected by causing digital camera 55 to capture an image of each individual projection area projected by each of the projectors in the projector array, and analyzing the captured image.

DSI module 137 is constructed to divide an input image to be projected by projectors 50 to 52 into sub-images based on the individual projection area projected by each of the projectors in the projector array. In some cases, DSI module 137 divides the input image into sub-images based on an aspect ratio of the input image.

MA module 138 is constructed to calculate a maximum area for each object on the projection surface. In some cases, the aspect ratio of the input image may also be used to determine the maximum area for each object.

HT module 139 is constructed to derive homography transformations for projectors 50 to 52 in order to facilitate keystone correction. In the first keystone correction mode, HT module 139 derives a homography transformation, and an inverse of the derived homography transformation, for each of the projectors involved in the projection of the single object. In the second keystone correction mode, HT module 139 derives a homography transformation, and an inverse of the derived homography transformation, for each of the projectors involved in the projection of each of the two or more objects.

ID module 140 is constructed to display the image 60 corresponding to the input image. ID module 140 provides image data which has been adjusted by HT module 139 to each of the projectors 50 to 52 for display based on the maximum area calculated by MA module 138 for each object.

The computer-executable process steps for control module 145 may be configured as a part of operating system 130, as part of an output device driver such as a projector driver, or as a stand-alone application program such as a multiprojector management system. They may also be configured as a plug-in or dynamic link library (DLL) to the operating system, device driver or application program. For example, control module 145 according to example embodiments may be incorporated in an output device driver for execution in a computing device, such as a projector driver, embedded in the firmware of an output device, such as a projector, or provided in a stand-alone application for use on a general purpose computer. In one example embodiment described herein, control module 145 is incorporated directly into the operating system for general purpose host computer 40. It can be appreciated that the present disclosure is not limited to these embodiments and that the disclosed control module may be used in other environments in which control of a multiprojector system is desired.

Figure 3:
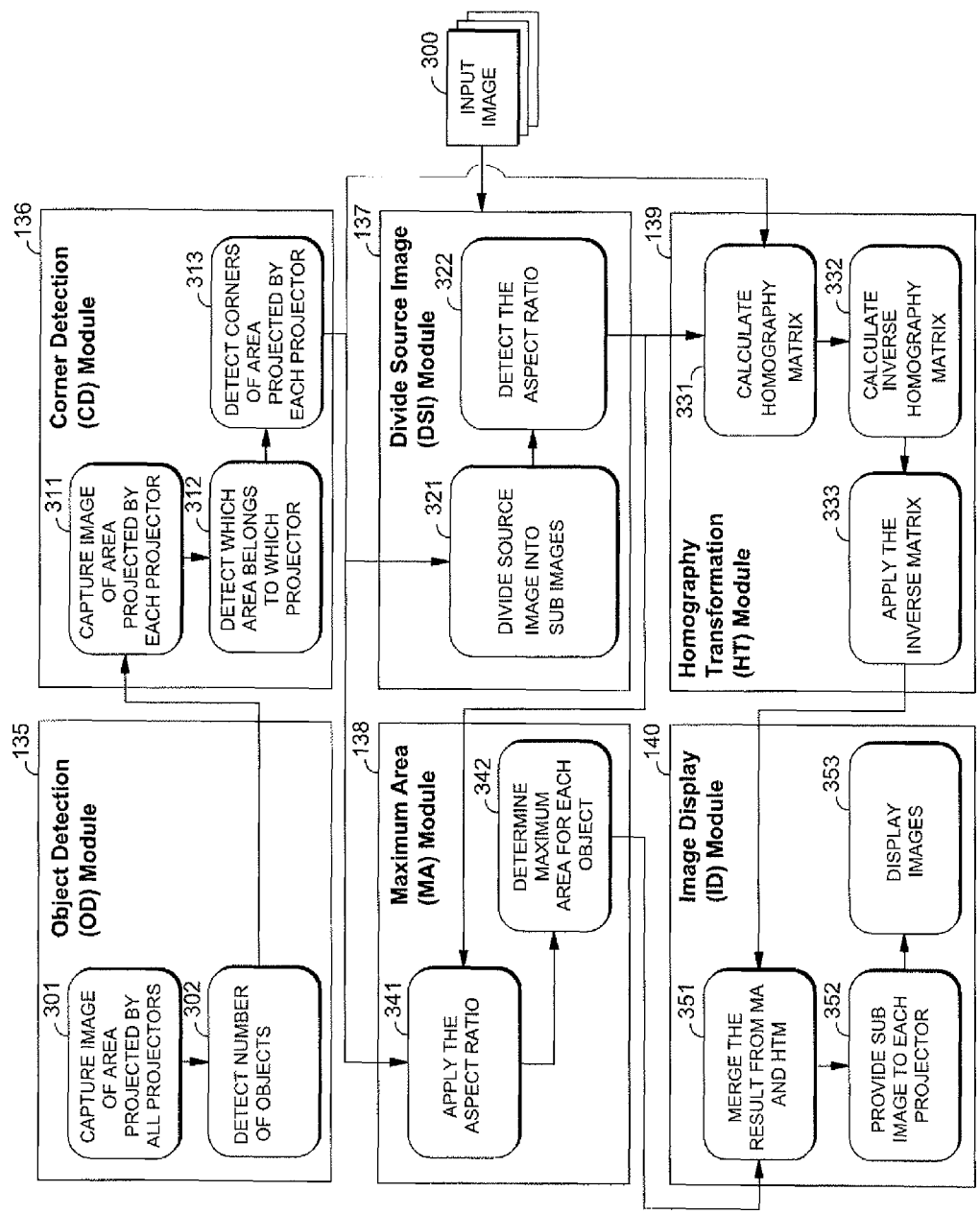
FIG. 3 is a view for explaining software architecture of a control module for a multiprojector system according to an example embodiment.

FIG. 3 is a view for explaining software architecture of control module 145 for a multiprojector system according to an example embodiment. As shown in FIG. 3, OD module 135 controls the multiprojector system such that an image is captured of the projection area projected by all projectors 50 to 52, and analyzes the captured image in order to output the number of objects displayed on the projection surface. In particular, OD module 135 comprises computer-executable process steps to cause digital camera 55 to capture an image of the projection area projected by all projectors 50 to 52 (301), and to analyze the captured image in order to detect a number of objects on the projection surface (302). More specifically, the computer-executable process steps of OD module 135 cause projectors 50 to 52 to display white light, such that all of individual projection areas A, B and C are displayed, and cause digital camera 55 to capture an image of the resulting projection area.

In this embodiment, the number of objects on the projection surface is detected by analyzing the captured image using, for example, a Canny algorithm to determine the coordinates of each of the corners of the objects displayed by the projector array. The coordinates of the corners are based on a virtual coordinate system of the projection surface. Based on the position of each of the corners, an overlap between the projection areas is determined such that the number of objects is detected. More specifically, if it is determined that two of the projection areas overlap, the two projection areas together comprise one single object. If it is determined that two of the projection areas do not overlap, then the two projection areas are considered as two separate objects. Of course, any other suitable method of determining the number of objects displayed on a projection surface may be used.

In accordance with the number of objects detected on the projection surface, a first or second keystone correction mode is selected.

CD module 136 accepts, as input, the number of objects on the projection surface detected by OD module 135, and outputs coordinates for each of the corners of each of the individual projection areas displayed by projectors 50 to 52. CD module 136 comprises computer-executable process steps to detect a corner of each individual projection area projected by each of projectors 50 to 52 (313) in order to determine which projector in the projector array is responsible for projecting a particular individual projection area (312). The corner of the individual projection area is detected by causing digital camera 55 to capture an image of each individual projection area projected by each of the projectors in the projector array (311), and analyzing the captured image. More specifically, one projector at a time is controlled to display white light, and digital camera 55 captures an image of the individual projection area displayed by the one projector.

In this embodiment, the corners of each of the individual projection areas on the projection surface are detected by analyzing the captured image using, for example, a Canny algorithm to determine the coordinates of each of the corners of the individual projection areas.

DSI module 137 accepts, as input, the coordinates of the corners of each individual projection area from CD module 136 and input image 300. Based on these inputs, DSI module 137 outputs the aspect ratio of the input image 300, and individual aspect ratios for each sub-image together with the image data for each sub-image. More specifically, DSI module 137 comprises computer-executable process steps to divide input image 300 into sub-images to be projected by each of projectors 50 to 52, based on the individual projection area projected by each of the projectors in the projector array (321). In some cases, DSI module 137 divides input image 300 into sub-images based on aspect ratio information of the input image, including, for example, the individual aspect ratios for each sub-image (322).

In other embodiments, DSI module 137 divides input image 300 based purely on the contents of input image 300, or purely on the characteristics of the multiprojector system, or a combination of both.

MA module 138 accepts, as input, the coordinates of the corners of each individual projection area, and the individual aspect ratios of each of the sub-images from DSI module 137. Based on these inputs, MA module 138 outputs coordinates indicating a maximum area on which an image can be displayed within an object (341). More specifically, MA module 138 comprises computer-executable process steps to calculate a maximum area for each object on the projection surface (342), taking into account the individual aspect ratios (341), such that the keystone-corrected image is displayed in a maximum area within a particular object in accordance with the aspect ratio of the input image 300.

In particular, in this embodiment, the maximum area is calculated by using a rectangle having the same aspect ratio as input image 300. Based on the coordinates of the corners of each individual projection area, the edges of each object are determined. For each object, a rectangle having the same aspect ratio as input image 300 is inscribed beginning at the upper left corner of the object, such that the rectangle meets the object at two edges. The size of the rectangle is increased, while maintaining the same aspect ratio, until a point on the rectangle meets a third edge of the object. The process is then repeated beginning at the upper right corner of the object, and the results of the two processes are compared such that coordinates indicating the position of a maximum area within each object are determined. While the above-discussed process has been provided here as an example, any suitable method of determining the maximum area for display may be used.

HT module 139 accepts, as input, the coordinates of the corners of each of the individual projection areas from CD module 136 and the individual aspect ratios of each of the sub-images from DSI module 137, together with the image data for each of the sub-images. Based on these inputs, HT module 139 outputs adjusted sub-images for display by projectors 50 to 52.

More specifically, HT module 139 comprises computer-executable process steps to derive homography transformations for each of the sub-images provided to projectors 50 to 52 in order to facilitate keystone correction (331). In the first keystone correction mode, HT module 139 derives a homography transformation (331), and an inverse of the derived homography transformation (332), for each of the projectors involved in the projection of the single object. In the second keystone correction mode, HT module 139 derives a homography transformation (331), and an inverse of the derived homography transformation (332), for each of the projectors involved in the projection of each of the two or more objects. HT module 139 further comprises computer-executable process steps to apply the inverses of the derived homography transformations to the image data for each corresponding sub-image (333).

ID module 140 accepts, as input, the coordinates indicating the maximum area on which an image can be displayed within an object from MA module 138, and adjusted sub-images from HTM module 139. Based on these inputs, ID module 140 outputs pre-distorted sub-images to each of projectors 50 to 52 in the projector array, such that each projector displays the appropriate portion of the image on the maximum area within each object on the projection screen, and such that the image is substantially aligned with the projection screen.

More specifically, ID module 140 comprises computer-executable process steps to cause projectors 50 to 52 to form keystone corrected image 60 corresponding to the input image 300 (353). ID module 140 provides image data which has been adjusted by HT module 139 to each of the projectors 50 to 52 for display (352) based on the maximum area calculated by MA module 138 for each object (351). In particular, ID module 140 scales and shifts each sub-image to adjust the sub-images for display on the maximum area within each object.

Figure 4:
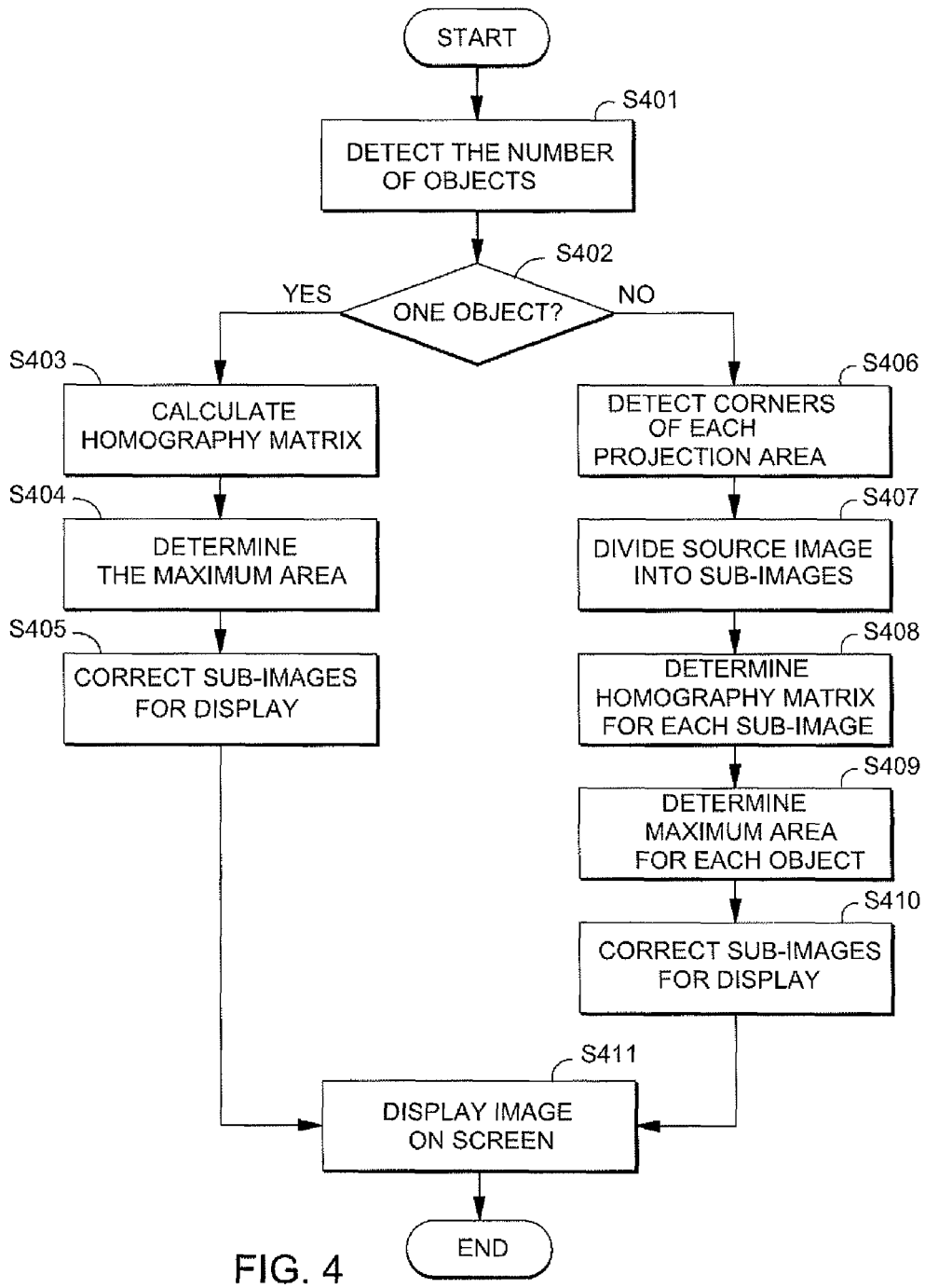
FIG. 4 is a flow diagram for explaining control of a multiprojector system according to an example embodiment.

FIG. 4 is a flow diagram for explaining control of a multiprojector system according to an example embodiment. The process steps shown in FIG. 4 are computer-executable process steps stored on a computer-readable memory medium such as at 145 on fixed disk 45, and are executed by CPU 113 of host computer 40, so as to implement a control module for control of a multiprojector system including multiple projectors arranged in a projector array. Briefly, according to the process steps shown in FIG. 4, it is determined whether the projector array is positioned to form one single object or is positioned to form two or more objects. One of at least first and second keystone correction modes is selected, where the first keystone correction mode is selected in response to a determination that the projector array is positioned to form one object, and the second keystone correction mode is selected in response to a determination that the projector array is positioned to form two or more objects. In the first keystone correction mode, a homography transformation for each of the projectors is derived so as to accommodate keystone correction of all projectors in the projector array involved in the projection of the single object. In the second keystone correction mode, a homography transformation for each of the projectors is derived so as to accommodate keystone correction of all projectors involved in the projection of each object. Inverses of the derived homography transformations are applied.

In more detail, in step S401, OD module 135 captures an image of the projection area displayed by all of the projectors in the projector array, and analyzes the captured image using a Canny algorithm in order to detect the number of objects displayed on the projection screen. Based on this determination, either the first or second keystone correction mode is selected at step S402.

If one single object is detected by OD module 135 ("YES" at S402), the first mode is selected in which a homography matrix is derived for each of the sub-images to be displayed by each of the projectors involved in the projection of the single object in step S403. The maximum area for display within the object is determined in step S404 by MA module 138, and the sub-images are pre-distorted and provided to each of the projectors for display in step S405.

On the other hand, if two or more objects are detected by OD module 135 ("NO" at S402), the second mode is selected in which CD module 136 determines which projector in the projector array is responsible for displaying a particular individual projection area, by detecting the corners of each individual projection area in step S406. In step S407, DSI module 137 divides input image 300 into sub-images based on the individual projection area displayed by each projector, and the aspect ratio of the input image 300.

The flow then proceeds to step S408, where HT module 139 derives a homography matrix, and an inverse of the derived homography matrix, for each sub-image to be provided to each projector 50 to 52 in the projector array, and applies the derived inverse homography matrix to the corresponding sub-image.

In step S409, MA module 138 determines the maximum area on which the image can be displayed within each object, and in step S410 ID module 140 scales and shifts the sub-images for display based on the maximum area within each object. The sub-images are displayed by each of projectors 50 to 52 to form image 60 in step S411.

It should be noted that steps S407 to S410 may be performed simultaneously for each detected object. Furthermore, in this embodiment, DSI module 137 divides input image 300 in step S407 before MA module 138 determines the maximum area. However, the order of operation of DSI module 137 and MA module 138 is interchangeable, and alternatively can be performed in parallel.

This disclosure has provided a detailed description with respect to particular representative embodiments. It is understood that the scope of the appended claims is not limited to the above-described embodiments and that various changes and modifications may be made without departing from the scope of the claims.

What is claimed is:

1. A control method for a multiprojector system, wherein the multiprojector system comprises multiple projectors arranged in a projector array, the method comprising:
    capturing an image including a respective individual projection area projected by each of the projectors in the projector array;
    determining whether the projector array is positioned to form one single display screen object or is positioned to form two or more separated display screen objects;
    dividing an image to be projected by the multiprojector system into sub-images based on the captured images of individual projection areas projected by each of the projectors in the projector array and based on an aspect ratio of the image to be projected by the multiprojector system in a case where it is determined that the projector array is positioned to form two or more separated display screen objects;
    selecting one of at least first and second keystone correction modes, wherein the first keystone correction mode is selected in response to a determination that the projector array is positioned to form one display screen object, and the second keystone correction mode is selected in response to a determination that the projector array is positioned to form two or more separated display screen objects and wherein the divided images are corrected to be displayed separately on each of the two or more separated display screen objects in the second keystone correction mode;
    wherein in the first keystone correction mode, a homography transformation for each of the projectors is derived so as to accommodate keystone correction of all projectors in the projector array involved in the projection of the single display screen object; and
    wherein in the second keystone correction mode, a homography transformation for each of the projectors is derived so as to accommodate keystone correction of all projectors involved in the projection of each separated display screen object; and
    applying inverses of the derived homography transformations.

2. The method of claim 1, wherein whether the projector array is positioned to form one single display screen object or two or more separated display screen objects is determined by capturing an image of a projection area projected by all of the projectors in the projector array and analyzing the captured image to detect a number of display screen objects.

3. The method of claim 1, further comprising calculating a maximum area for each display screen object; and
    providing the sub-images to the projectors in the projector array for display based on the maximum area for each display screen object.

4. The method of claim 3, wherein the maximum area for each display screen object is calculated based on the aspect ratio of the image to be projected by the multiprojector system and on the captured images of the individual projection areas projected by each of the projectors in the projector array.

5. The method of claim 4, wherein a division of an image to be projected by the multiprojector system into sub-images and a calculation of the maximum area are performed in parallel.

6. The method of claim 1, further comprising determining which projector in the projector array is responsible for projecting an individual projection area by detecting a corner of each individual projection area projected by each of the projectors in the projector array based on the captured images of the individual projection areas projected by each of the projectors in the projector array.

7. A control method for a multiprojector system, wherein the multiprojector system comprises multiple projectors arranged in a projector array, and wherein a first group of the multiple projectors is positioned to form one single display screen object and a second group of the multiple projectors is positioned to form two or more separated display screen objects, the method comprising:

capturing an image including a respective individual projection area projected by each of the projectors in the projector array;

dividing an image to be projected by the multiprojector system into sub-images based on the captured images of individual projection areas projected by each of the projectors in the projector array and based on an aspect ratio of the image to be projected by the multiprojector system in a case where it is determined that the projector array forms two or more separated display screen objects;

deriving a homography transformation for each of the projectors in the first group of projectors so as to accommodate keystone correction of all projectors in the first group of projectors involved in the projection of the one single display screen object;

deriving a homography transformation for each of the projectors in the second group of projectors so as to accommodate keystone correction of all projectors in the second group of projectors involved in the projection of each separated display screen object;

applying inverses of the derived homography transformations.

8. The method of claim 7, further comprising calculating a maximum area for each display screen object; and providing the sub-images to the projectors in the projector array for display based on the maximum area for each display screen object.

9. The method of claim 8, wherein the maximum area is calculated based on the aspect ratio of the image to be projected by the multiprojector system and on the captured images of the individual projection areas projected by each of the projectors in the projector array.

10. The method of claim 7, further comprising determining which projector in the projector array is responsible for projecting an individual projection area by detecting a corner of each individual projection area projected by each of the projectors in the projector array based on the captured images of the individual projection areas projected by each of the projectors in the projector array.

11. A control module for a multiprojector system, wherein the multiprojector system comprises multiple projectors arranged in a projector array, the module comprising:

a capture module constructed to capture an image including a respective individual projection area projected by each of the projectors in the projector array;

an object detection module constructed to determine whether the projector array is positioned to form one single display screen object or is positioned to form two or more separated display screen objects;

an image dividing module constructed to divide an image to be projected by the multiprojector system into sub-images based on the captured images of the individual projection areas projected by each of the projectors in the projector array and based on an aspect ratio of the image to be projected by the multiprojector system in a case where it is determined that the projector array is positioned to form two or more separated display screen objects;

a homography transformation module constructed to derive a homography transformation for each of the projectors so as to accommodate keystone correction of all projectors involved in the projection of a single display screen object in a first mode, and to derive a homography transformation for each of the projectors so as to accommodate keystone correction of all projectors involved in the projection of each separated display screen object in a second mode, wherein the homography transformation module is further constructed to apply inverses of the derived homography transformations, and wherein the first keystone correction mode is selected in response to a determination that the projector array is positioned to form one single display screen object, and the second keystone correction mode is selected in response to a determination that the projector array is positioned to form two or more separated display screen objects.

12. The control module of claim 11, wherein the object detection module determines whether the projector array is positioned to form one single display screen object or is positioned to form two or more separated display screen objects by capturing an image of a projection area projected by all of the projectors in the projector array and analyzing the captured image to detect a number of display screen objects.

13. The control module of claim 11, further comprising a maximum area calculation module constructed to calculate a maximum area for each display screen object; and an image display module constructed to provide the sub-images to the projectors in the projector array for display based on the maximum area for each display screen object.

14. The control module of claim 13, wherein the maximum area is calculated based on the aspect ratio of the image to be projected by the multiprojector system and on the captured images of the individual projection areas projected by each of the projectors in the projector array.

15. The control module of claim 11, further comprising a corner detection module constructed to determine which projector in the projector array is responsible for projecting an individual projection area by detecting a corner of each individual projection area projected by each of the projectors in the projector array based on the captured images of the individual projection areas projected by each of the projectors in the projector array.

16. A control apparatus for a multiprojector system, wherein the multiprojector system comprises multiple projectors arranged in a projector array, and wherein a first group of the multiple projectors is positioned to form one single display screen object and a second group of the multiple projectors is positioned to form two or more separated display screen objects, the apparatus comprising:

a computer-readable memory constructed to store computer-executable process steps; and a processor constructed to execute the computer-executable process steps stored in the memory;

wherein the process steps stored in the memory comprise computer-executable process steps to:

capture an image including a respective individual projection area projected by each of the projectors in the projector array;

determine whether the projector array is positioned to form one single display screen object or is positioned to form two or more separated display screen objects;

divide an image to be projected by the multiprojector system into sub-images based on the captured images of individual projection areas projected by each of the projectors in the projector array and based on an aspect ratio of the image to be projected by the multiprojector system in a case where it is determined that the projector array forms two or more separated display screen objects;

select one of at least first and second keystone correction modes, wherein the first keystone correction mode is selected in response to a determination that the projector array is positioned to form one display screen object, and the second keystone correction mode is selected in response to a determination that the projector array is positioned to form two or more separated display screen objects and wherein the divided images are corrected to be displayed separately on each of the two or more separated display screen objects in the second keystone correction mode;

wherein in the first keystone correction mode, a homography transformation for each of the projectors is derived so as to accommodate keystone correction of all projectors in the projector array involved in the projection of the single display screen object; and wherein in the second keystone correction mode, a homography transformation for each of the projectors is derived so as to accommodate keystone correction of projectors involved in the projection of each separated display screen object; and apply inverses of the derived homography transformations.

17. The control apparatus of claim 16, wherein whether the projector array is positioned to form one single display screen object or two or more separated display screen objects is determined by capturing an image of a projection area projected by all of the projectors in the projector array and analyzing the captured image to detect a number of display screen objects.

18. The control apparatus of claim 16, wherein the process steps further comprise computer-executable process steps to:
calculate a maximum area for each display screen object; and
provide the sub-images to the projectors in the projector array for display based on the maximum area for each display screen object.

19. The control apparatus of claim 18, wherein the maximum area is calculated based on the aspect ratio of the image to be projected by the multiprojector system and on the captured images of the individual projection areas projected by each of the projectors in the projector array.

20. The control apparatus of claim 16, wherein the process steps further comprise computer-executable process steps to determine which projector in the projector array is responsible for projecting an individual projection area by detecting a corner of each individual projection area projected by each of the projectors in the projector array based on the captured images of the individual projection areas projected by each of the projectors in the projector array.

21. A control apparatus for a multiprojector system, wherein the multiprojector system comprises multiple projectors arranged in a projector array, and wherein a first group of the multiple projectors is positioned to form one single display screen object and a second group of the multiple projectors is positioned to form two or more separated display screen objects, the apparatus comprising:

a computer-readable memory constructed to store computer-executable process steps; and
a processor constructed to execute the computer-executable process steps stored in the memory;
wherein the process steps stored in the memory comprise computer-executable process steps to:
capture an image including a respective individual projection area projected by each of the projectors in the projector array;
divide an image to be projected by the multiprojector system into sub-images based on the captured images of individual projection areas projected by each of the projectors in the projector array and based on an aspect ratio of the image to be projected by the multiprojector system in a case where it is determined that the projector array forms two or more separated display screen objects;
derive a homography transformation for each of the projectors in the first group of projectors so as to accommodate keystone correction of all projectors in the first group of projectors involved in the projection of the single display screen object;
derive a homography transformation for each of the projectors in the second group of projectors so as to accommodate keystone correction of all projectors in the second group of projectors involved in the projection of each separated display screen object;
apply inverses of the derived homography transformations.

22. The control apparatus of claim 21, wherein the process steps further comprise computer-executable process steps to:
calculate a maximum area for each display screen object; and
provide the sub-images to the projectors in the projector array for display based on the maximum area for each display screen object.

23. The control apparatus of claim 22, wherein the maximum area is calculated based on the aspect ratio of the image to be projected by the multiprojector system and on the captured images of the individual projection areas projected by each of the projectors in the projector array.

24. The control apparatus of claim 21, wherein the process steps further comprise computer-executable process steps to determine which projector in the projector array is responsible for projecting an individual projection area by detecting a corner of each individual projection area projected by each of the projectors in the projector array based on the captured images of the individual projection areas projected by each of the projectors in the projector array.

25. A computer-readable memory medium on which is stored computer-executable process steps for controlling a multiprojector system, wherein the multiprojector system comprises multiple projectors arranged in a projector array, the process steps comprising:
capturing an image including a respective individual projection area projected by each of the projectors in the projector array;
determining whether the projector array is positioned to form one single display screen object or is positioned to form two or more separated display screen objects;
dividing an image to be projected by the multiprojector system into sub-images based on the captured images of individual projection areas projected by each of the projectors in the projector array and based on an aspect ratio of the image to be projected by the multiprojector system in a case where it is determined that the projector array is positioned to form two or more separated display screen objects;

selecting one of at least first and second keystone correction modes, wherein the first keystone correction mode is selected in response to a determination that the projector array is positioned to form one display screen object, and the second keystone correction mode is selected in response to a determination that the projector array is positioned to form two or more separated display screen objects and wherein the divided images are corrected to be displayed separately on each of the two or more separated display screen objects in the second keystone correction mode;

wherein in the first keystone correction mode, a homography transformation for each of the projectors is derived so as to accommodate keystone correction of all projectors in the projector array involved in the projection of a single display screen object; and wherein in the second keystone correction mode, a homography transformation for each of the projectors is derived so as to accommodate keystone correction of projectors involved in the projection of each separated display screen object; and applying inverses of the derived homography transformations.

26. The computer-readable memory medium of claim 25, wherein whether the projector array is positioned to form one single display screen object or two or more separated display screen objects is determined by capturing an image of a projection area projected by all of the projectors in the projector array and analyzing the captured image to detect a number of display screen objects.

27. The computer-readable memory medium of 25, the process steps further comprising calculating a maximum area for each display screen object; and providing the sub-images to the projectors in the projector array for display based on the maximum area for each display screen object.

28. The computer-readable memory medium of claim 27, wherein the maximum area is calculated based on the aspect ratio of the image to be projected by the multiprojector system and on the captured images of the individual projection areas projected by each of the projectors in the projector array.

29. The computer-readable memory medium of claim 28, wherein a division of an image to be projected by the multiprojector system into sub-images and a calculation of the maximum area are performed in parallel.

30. The computer-readable memory medium of claim 25, the process steps further comprising determining which projector in the projector array is responsible for projecting an individual projection area by detecting a corner of each individual projection area projected by each of the projectors in the projector array based on the captured images of the individual projection areas projected by the projectors in the projector array.

31. A computer-readable memory medium on which is stored computer-executable process steps for controlling a multiprojector system, wherein the multiprojector system comprises multiple projectors arranged in a projector array, and wherein a first group of the multiple projectors is positioned to form one single display screen object and a second group of the multiple projectors is positioned to form two or more separated display screen objects, the process steps comprising:

capturing an image including a respective individual projection area projected by each of the projectors in the projector array;

dividing an image to be projected by the multiprojector system into sub-images based on the captured images of individual projection areas projected by each of the projectors in the projector array and based on an aspect ratio of the image to be projected by the multiprojector system in a case where it is determined that the projector array forms two or more separated display screen objects;

deriving a homography transformation for each of the projectors in the first group of projectors so as to accommodate keystone correction of all projectors in the first group of projectors involved in the projection of the single display screen object;

deriving a homography transformation for each of the projectors in the second group of projectors so as to accommodate keystone correction of all projectors in the second group of projectors involved in the projection of each separated display screen object;

applying inverses of the derived homography transformations.

32. The computer-readable memory medium of claim 31, the process steps further comprising calculating a maximum area for each display screen object; and providing the sub-images to the projectors in the projector array for display based on the maximum area for each display screen object.

33. The computer-readable memory medium of claim 32, wherein the maximum area is calculated based on the aspect ratio of the image to be projected by the multiprojector system and on the captured images of the individual projection areas projected by each of the projectors in the projector array.

34. The computer-readable memory medium of claim 31, the process steps further comprising determining which projector in the projector array is responsible for projecting an individual projection area by detecting a corner of each individual projection area projected by each of the projectors in the projector array based on the captured images of the individual projection areas projected by each of the projectors in the projector array.

* * * * *